United States Patent
Utsunomiya et al.

(10) Patent No.: US 12,112,085 B2
(45) Date of Patent: Oct. 8, 2024

(54) VEHICLE DISPLAY CONTROL DEVICE, VEHICLE DISPLAY CONTROL METHOD, AND VEHICLE DISPLAY CONTROL PROGRAM PRODUCT

(71) Applicant: DENSO CORPORATION, Kariya (JP)

(72) Inventors: Masato Utsunomiya, Kariya (JP); Jinhae Choi, Kariya (JP); Shohei Sato, Kariya (JP); Hiroki Matsui, Kariya (JP)

(73) Assignee: DENSO CORPORATION, Kariya (JP)

( * ) Notice: Subject to any disclaimer, the term of this patent is extended or adjusted under 35 U.S.C. 154(b) by 135 days.

(21) Appl. No.: 17/475,509

(22) Filed: Sep. 15, 2021

(65) Prior Publication Data

US 2022/0004348 A1    Jan. 6, 2022

Related U.S. Application Data (63) Continuation of application No. PCT/JP2020/008677, filed on Mar. 2, 2020.

(30) Foreign Application Priority Data

Mar. 18, 2019   (JP) .................. 2019-050304

(51) Int. Cl.
G06F 3/14       (2006.01)
G06T 11/00      (2006.01)
G08B 5/22       (2006.01)

(52) U.S. Cl.
CPC ............... G06F 3/14 (2013.01); G06T 11/00 (2013.01); G08B 5/22 (2013.01)

(58) Field of Classification Search
CPC ............. G06F 3/14; G06T 11/00; G08B 5/22
See application file for complete search history.

(56) References Cited

U.S. PATENT DOCUMENTS

| | | | | |
|---|---|---|---|---|
| 2006/0066762 | A1* | 3/2006 | Suwa | H04N 21/482 348/837 |
| 2008/0269998 | A1* | 10/2008 | Shiiba | B60W 10/11 701/70 |
| 2012/0322617 | A1* | 12/2012 | Takahashi | B60W 30/18036 477/96 |
| 2015/0352956 | A1* | 12/2015 | Miuchi | B62D 15/0295 701/41 |
| 2016/0176413 | A1 | 6/2016 | Oguri | |
| 2018/0043896 | A1 | 2/2018 | Lee et al. | |
| 2018/0134262 | A1* | 5/2018 | Kurahashi | B60K 35/00 |
| 2020/0012097 | A1* | 1/2020 | Kubota | G08G 1/16 |
| 2020/0132498 | A1 | 4/2020 | Matsumaru | |
| 2020/0231181 | A1* | 7/2020 | Miyahara | B62D 15/025 |

FOREIGN PATENT DOCUMENTS

| | | | |
|---|---|---|---|
| JP | 2016117300 | A | 6/2016 |
| JP | 2017117050 | A | 6/2017 |
| JP | 2017182559 | A | 10/2017 |
| WO | WO-2017072959 | A1 | 5/2017 |
| WO | WO-2019016931 | A1 | 1/2019 |

* cited by examiner

Primary Examiner — Michelle Chin
(74) Attorney, Agent, or Firm — Harness, Dickey & Pierce, P.L.C.

(57) ABSTRACT

A vehicle display control device includes a display and a display controller executing a content display process to display, on the display, a content indicating an operation time of a vehicle. The display controller stops executing of the content display process in response to the vehicle being not operated at the operation time indicated by the displayed content.

14 Claims, 8 Drawing Sheets

VEHICLE DISPLAY CONTROL DEVICE, VEHICLE DISPLAY CONTROL METHOD, AND VEHICLE DISPLAY CONTROL PROGRAM PRODUCT

CROSS REFERENCE TO RELATED APPLICATION

The present application is a continuation application of International Patent Application No. PCT/JP2020/008677 filed on Mar. 2, 2020, which designated the U.S., and claims the benefit of priority from Japanese Patent Application No. 2019-050304 filed on Mar. 18, 2019. The entire disclosures of all of the above applications are incorporated herein by reference.

TECHNICAL FIELD

The present disclosure relates to a vehicle display control device, a vehicle display control method, and a vehicle display control program product.

BACKGROUND

Conventionally, a processor mounted to a vehicle controls driver's operations of the vehicle based on various kinds of information.

SUMMARY

The present disclosure provides a vehicle display control device which includes a display and a display controller executing a content display process to display, on the display, a content indicating an operation time of a vehicle. The display controller stops executing of the content display process in response to the vehicle being not operated at the operation time indicated by the displayed content.

BRIEF DESCRIPTION OF DRAWINGS

Objects, features and advantages of the present disclosure will become apparent from the following detailed description made with reference to the accompanying drawings. In the drawings.

DETAILED DESCRIPTION

Conventionally, a processor mounted to a vehicle controls operations of the vehicle based on various kinds of information. For example, in a conventional art, a processor mounted on a vehicle determines whether to execute a regenerative brake control based on accelerator off information and brake on information. The accelerator off information indicates an operation amount of an accelerator pedal operated by the driver is smaller than a predetermined threshold. The brake on information indicates an operation amount of a brake pedal operated by the driver is greater than a predetermined threshold.

Usually, in a vehicle, a processor controls various operations according to an operation state of, for example, an accelerator pedal or a brake pedal operated by a driver. Therefore, an improved optimization of the operation made by the driver can improve a control executed by the processor, and thereby, improving an optimized travelling of the vehicle.

Therefore, the present disclosure provides a vehicle display control device, a vehicle display control method, and a vehicle display control program each of which enables further optimization of vehicle operation made by a driver.

According to an aspect of the present disclosure, a vehicle display control device includes: a display; and a display controller executing a content display process. In the content display process, the display controller displays a content indicating an operation time of a vehicle on the display.

According to another aspect of the present disclosure, a display control method includes displaying a content indicating an operation time of a vehicle on a display.

According to another aspect of the present disclosure, a vehicle display control program including an instruction for displaying a content indicating an operation time of a vehicle on a display. The program may be stored in a computer readable non-transitory storage medium as a program product.

In the present disclosure, the vehicle is operated, by the driver, based on a time indicated by the content displayed on the display. Thus, the operation of the vehicle can be made at an optimum time. As a result, it is possible to further optimize the operation of the vehicle by the driver, thereby improving an optimized travelling of the vehicle.

The following will describe embodiments of the present disclosure with reference to accompanying drawings. Elements that are substantially the same in the embodiments are denoted by the same reference signs, and description thereof will be omitted.

(Common Configuration)

Figure 1:
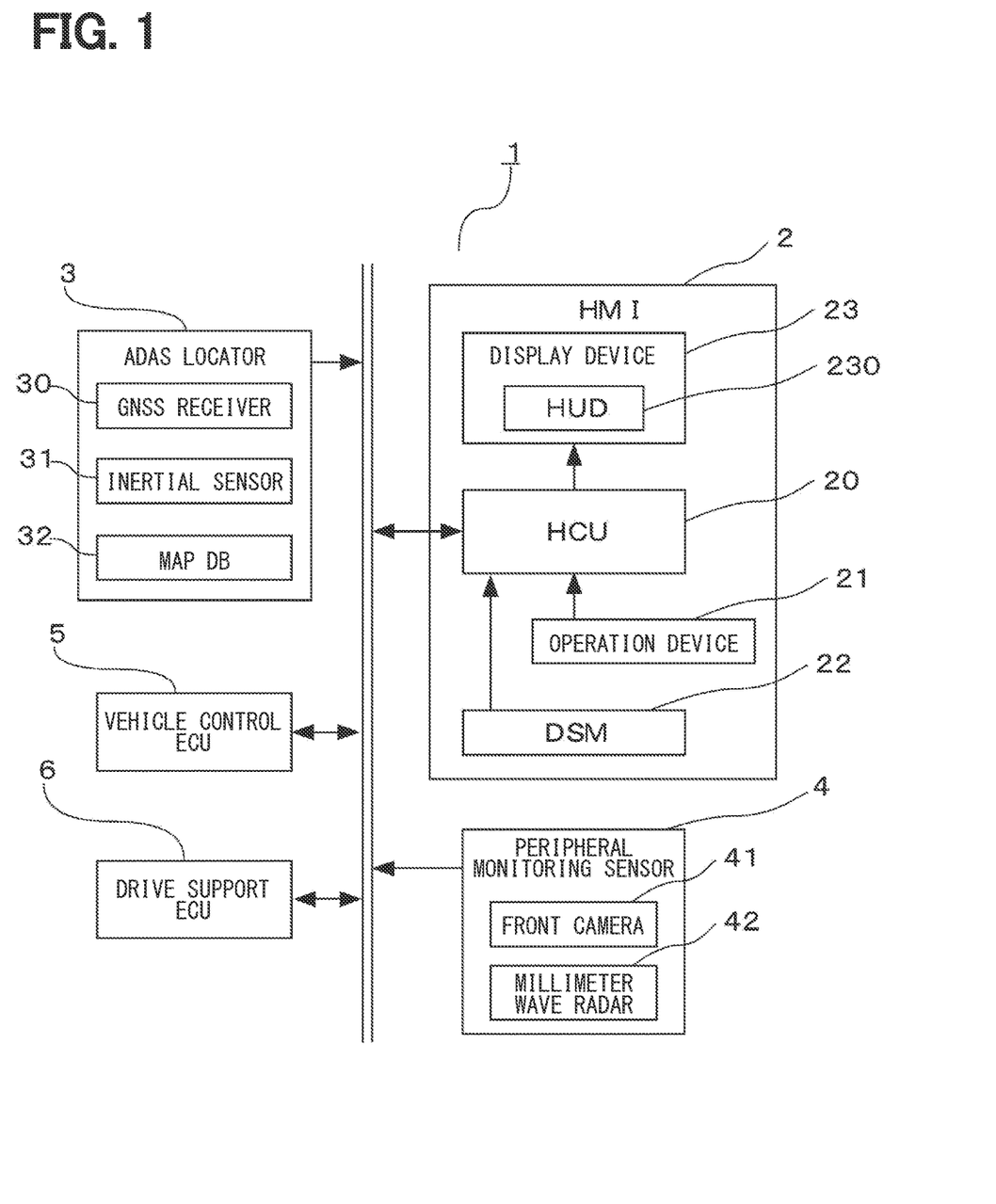
FIG. 1 is a diagram schematically showing a configuration example of a vehicle system according to the present disclosure.

Before describing embodiments of the present disclosure, a basic configuration example common to the embodiments according to the present disclosure will be described. A vehicle system 1 illustrated in FIG. 1 is applied to a moving body, such as a vehicle traveling on a road. The vehicle system 1 includes a human machine interface (HMI) system 2 and an advanced driver assistance system (ADAS) locator 3, a peripheral monitoring sensor 4, a vehicle control electronic control unit (vehicle control ECU) 5, a driving support electronic control unit (driving assistance ECU) 6, and the like. The HMI system 2, the ADAS locator 3, the peripheral monitoring sensor 4, the vehicle control ECU 5, and the driving support ECU 6 are connected to, for example, an in-vehicle local area network (LAN) mounted on the vehicle.

The ADAS locator 3 includes a global navigation satellite system (GNSS) receiver 30, an inertial sensor 31, a map database 32, and the like. Hereinafter, the map database 32 is also referred to as a map DB 32. The GNSS receiver 30 receives positioning signals from multiple artificial satellites. The inertial sensor 31 includes, for example, a gyro sensor, an acceleration sensor, and the like. The ADAS locator 3 successively specifies a position of own vehicle on which the vehicle system 1 is mounted by combining the positioning signals received by the GNSS receiver 30 and detection result of the inertial sensor 31. The ADAS locator 3 outputs the specified vehicle position via the in-vehicle LAN. The vehicle position is represented in a coordinate system using latitude and longitude. In this coordinate system, for example, x-axis indicates longitude and y-axis indicates latitude. It should be noted that the specifying of the vehicle position may be executed in various manners except the above-described method. For example, the position of the vehicle may be specified based on travelling distance information obtained from the detection result by a vehicle speed sensor mounted on the own vehicle.

The map DB 32 may be provided by a non-volatile memory, and stores map data including various data such as link data, node data, and road shape data. The link data includes: link identification data that identifies each link configuring the road included in the map; link length data that indicates a length of the link; link orientation data that indicates an orientation of the link; and link travel time data that indicates a time required to travel the link; node coordinate data indicating coordinates of nodes including a start point and an end point of the link; and link attribute data indicating an attribute of the road. The node data includes: node identification data that identifies a node included in the map; a node coordinate data that indicates a coordinate of the node; node name data that indicates a name of the node; node type data that indicates a type of the node such as an intersection; and connection link data that identifies one or more links connected to the node. Road shape data indicates a shape of a road included in the map. The road shape data may further include: data indicating an altitude of the road; a cross slope of the road; a longitudinal slope of the road, and the like.

The map data may be acquired from an external source positioned outside of the own vehicle via, for example, a communication module mounted on the vehicle. Further, as the map data, a three dimensional map data including a point cloud may be used. The point cloud may include a feature point of the road shape, a feature point of a structure existing on the map, or the like. When using the three dimensional map data, the ADAS locator 3 may specify the position of own vehicle using a sensing result of a light detection and ranging/laser imaging detection and ranging (LIDAR) which detects the three dimensional map data and point cloud of the three dimensional map data.

The peripheral monitoring sensor 4 is configured to monitor a surrounding environment of the own vehicle, and may be provided as an autonomous sensor that operates autonomously. The peripheral monitoring sensor 4 detects an object existing around the own vehicle. For example, the object may be a dynamic object that moves around the own vehicle. For example, the dynamic object may include a human being such as a pedestrian, an animal other than the human being, a vehicle other than the own vehicle. The object may also be a static object that is in a stationary state around the own vehicle. For example, the static object may include a falling object existing on the road, guardrails of the road, curbs of the road, trees, and the like. The peripheral monitoring sensor 4 can detect road markings around the own vehicle. The road markings may include traveling lane markings, temporary stop lines, pedestrian crossings, symbols or characters for attention of temporary stop marked on the roads. The peripheral monitoring sensor 4 successively outputs the obtained sensing data to the in-vehicle LAN. The peripheral monitoring sensor 4 may include a peripheral monitoring camera that captures images of a predetermined range around the own vehicle, a millimeter wave radar that outputs a scanning wave toward a predetermined range around the own vehicle, a sonar, a scanning wave sensor such as LIDAR, or the like.

The scanning wave sensor successively outputs a scanning result obtained based on received signals, which are obtained by receiving reflection waves reflected by the object, to the in-vehicle LAN as the sensing data. More specifically, the scanning wave sensor measures a distance from the scanning wave sensor to a target object based on a time period elapsed from a transmission of the scanning wave to a reception of the reflection wave reflected by the target object. The scanning wave sensor measures a direction of the object with respect to the scanning wave sensor based on an angle in which the reflection wave is received. The direction may be represented by an azimuth. The azimuth may include a positive azimuth which is in clockwise direction with a forward direction of the own vehicle as a reference and a negative azimuth which is in counterclockwise direction with the forward direction of the own vehicle as the reference.

The peripheral monitoring sensor 4 at least includes a front camera 41 capturing images of a predetermined range in front of the own vehicle, and a millimeter wave radar 42 having a predetermined scanning range in front of the own vehicle. The front camera 41 may be provided, for example, on a surface of a rearview mirror, or on an upper surface of an instrument panel within the vehicle. The millimeter wave radar 42 may be provided, for example, on a front grille, on a front bumper or the like. The millimeter wave radar 42 transmits millimeter waves or quasi-millimeter waves which scans the sensing range in front of the own vehicle, and receives the reflection waves. The millimeter wave radar 42 measures a distance to the target object and a direction of the target object relative to the millimeter wave radar 42 based on the reflection waves. The sensing range of the front camera 41 and the sensing range of the millimeter wave radar 42 may be the same or may be different. The sensing range of the front camera 41 and the sensing range of the millimeter wave radar 42 may be partially overlapped with one another, or may be not overlapped with one another. Further, multiple peripheral monitoring sensors 4 may be provided at different locations of the own vehicle.

The vehicle control ECU 5 is an electronic control unit for controlling acceleration and deceleration control, steering control, braking control of the own vehicle. The vehicle control ECU 5 may include a power unit control ECU that controls acceleration and deceleration of the own vehicle, a steering control ECU that controls the steering of the own vehicle, a brake control ECU that controls braking of the own vehicle. The vehicle control ECU 5 outputs controls signals to devices related to various travelling controls based on detection signals output from various sensors of the vehicle. The sensors may include an accelerator position sensor, a brake depression sensor, a steering angle sensor, a vehicle wheel speed sensor, or the like. The devices related to travelling controls may include an electronic control throttle, a brake actuator, an electric power steering (EPS) motor. The vehicle control ECU 5 can output detection signals obtained from various sensors to the in-vehicle LAN.

The driving support ECU 6 supports the driver with driving operation by, for example, cooperating with the vehicle control ECU 5. The support provided by the driving support ECU 6 also includes an autonomous driving function that autonomously controls the travelling of the own vehicle. The driving support ECU 6 recognizes a driving environment of the own vehicle based on the vehicle position of the own vehicle acquired from the ADAS locator 3, the map data stored in the map DB 32, the sensing data acquired from the peripheral monitoring sensor 4, or the like. More specifically, the driving support ECU 6 may recognize a position, a shape, a moving state of an object existing around the own vehicle based on sensing data acquired from the peripheral monitoring sensor 4. The driving support ECU 6 may recognize a position, a size, content of a road surface marking existing around the own vehicle. The driving support ECU 6 may combine the recognized information with map data, position of the own vehicle so that an actual driving environment around the own vehicle can be generated as a virtual space in three dimension manner.

The driving support ECU 6 generates a drive plan for autonomously driving the own vehicle by an autonomous driving function based on the recognized driving environment. As the drive plan, a long- to medium term drive plan or a short term drive plan can be generated. In the short term drive plan, the generated virtual space around the own vehicle is used in, for example, acceleration or deceleration control for maintaining a target inter-vehicle distance from the own vehicle to a preceding vehicle, steering control for lane tracing and lane change, or brake control for collision avoidance. In the long- to medium term drive plan, a recommended route and driving schedule for the vehicle to reach the destination are determined. The driving support ECU 6 may generate only the short term drive plan, or may generate only the long-to-medium term drive plan.

For example, the autonomous driving function executed by the driving support ECU 6 may include adaptive cruise control (ACC) function that controls a traveling speed of the own vehicle so as to maintain a target inter-vehicle distance from the own vehicle to the preceding vehicle by adjusting a driving force and a braking force of the vehicle. The autonomous driving function may include an autonomous emergency braking (AEB) function that forcibly decelerates the own vehicle by generating a braking force based on the sensing result of a front situation of the vehicle The ACC function and the AEB function are merely examples, and the driving support ECU 6 may be configured to provide other functions.

The HMI system 2 includes a human machine interface control unit (HCU) 20, an operation device 21, a driver status monitor (DSM) 22, and a display device 23. The HMI system 2 accepts an operation input by a driver who is a user of the own vehicle, and notifies various information to the driver of the own vehicle. The operation device 21 includes various switches operable by the driver of the own vehicle.

The operation device 21 is used to make various settings and the like. The operation device 21 may include a steering switch or the like provided on a spokes of the steering wheel of the own vehicle. The operation device 21 may include an accelerator pedal, a brake pedal, and the like provided at the driver's seat of the vehicle. The accelerator pedal, brake pedal, and the like included in the operation device 21 are operated by the driver, and correspond to an example of an operation input unit that inputs an operation to the vehicle.

The DSM 22 may include a light source that emits near-infrared light, a near-infrared light camera that detects the near-infrared light, a control unit that controls the light source and the near-infrared light camera. The DSM 22 may be arranged on a steering column cover or on an upper surface of the instrument panel in a posture so that the near-infrared light camera is directed toward the driver's seat of the own vehicle. The DSM 22 uses the near-infrared light camera to capture an image of the head of the driver under a condition that the head of the driver is irradiated with the near-infrared light emitted from the near-infrared light source. The image captured by the near-infrared light camera is processed by an image analyzing by a control unit (not shown). For example, the control unit may extract the driver's eyes from the captured image and detects positions of the driver's eyes relative to a reference position as a viewpoint position. Herein, the reference position may be set at a predetermined position within a compartment of the own vehicle. For example, an installation position of the near-infrared light camera in the compartment of the vehicle may be set as the reference position. The DSM 22 outputs information indicating the detected viewpoint position of the driver to the HCU 20. The control unit can specify or estimate a driver's line of sight, that is, a direction in which the driver's eye is oriented, by performing image analyzing to the image captured by the near-infrared light camera. The DSM 22 outputs the specified or estimated line-of-sight information indicating the direction of the line-of-sight of the driver to the HCU 20.

Figure 2:
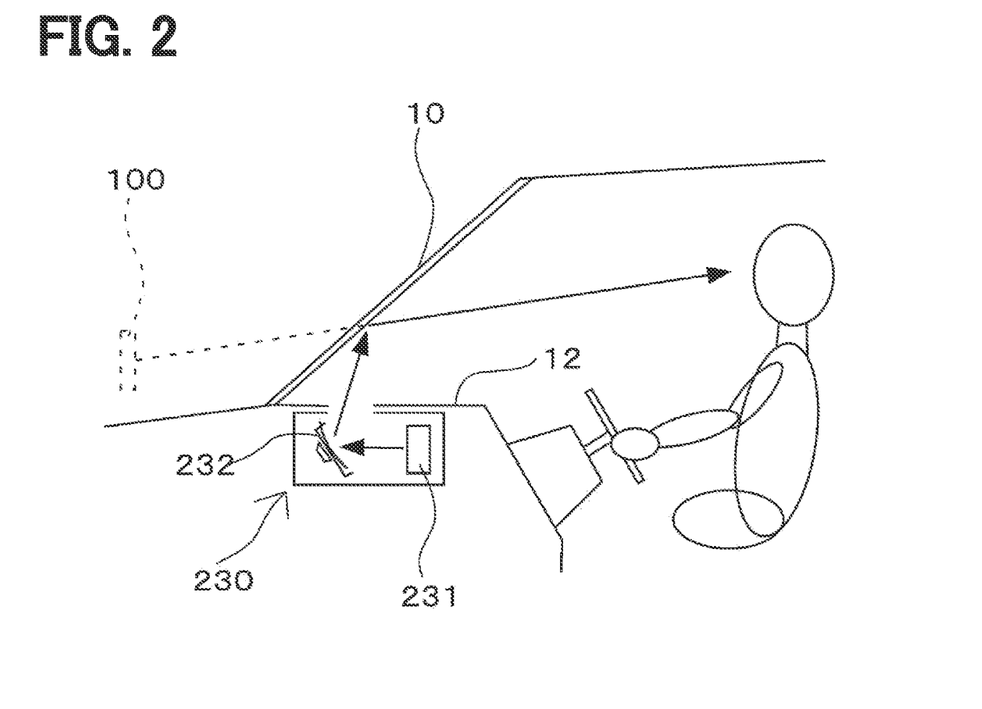
FIG. 2 is a diagram schematically showing a mounting example of a head-up display on a vehicle according to the present disclosure.

The display device 23 corresponds to a display, and may be configured as a head up display (HUD) 230. Hereinafter, the head up display 230 will be referred to as a HUD 230. As illustrated in FIG. 2, the HUD 230 may be provided to the instrument panel 12 of the own vehicle. The HUD 230 generates a display image based on the image data output from the HCU 20 by, for example, a liquid crystal projector 231 or a scanning projector 231. The display image may be an image showing information related to a route guidance of the vehicle.

The HUD 230 projects the display image generated by the projector 231 onto a front windshield 10 of the vehicle via an optical system 232. The front windshield corresponds to an example of a projection portion. The optical system 232 may include a concave mirror or the like. The front windshield 10 is provided with a projection area R, and the display image generated by the projector 231 is projected in the projection area R. The projection area R is located in front of the driver's seat, specifically, in front of the driver who is seated in the driver's seat.

A light beam of the display image which is reflected by the front windshield 10 and returns to an inside of the vehicle compartment is visually perceived by the driver seated in the driver's seat. The front windshield 10 is made of, for example, a translucent glass material, and the scenery, that is, luminous flux of the scenery in front of the own vehicle is also visually perceived and recognized by the driver seated in the driver's seat. As a result, the driver can recognize the virtual image corresponding to the display image at a virtual position in front of the front windshield 10 in a state where a part of the foreground is superimposed with the virtual image content 100. The HUD 230 provides augmented reality (AR) display by superimposing the virtual image content 100 on the foreground of the own vehicle. The virtual image content 100 includes at least information related to the driving support of the own vehicle, that is, content that visually represents driving support related information. Examples of the driving support related information include: route guidance related information indicating the traveling direction of the own vehicle in the guidance route; autonomous driving related information indicating a travelling route of the own vehicle when the own vehicle is controlled to execute the autonomous driving; lane information indicating the travelling lane of the own vehicle; curve notification information notifying a curve existing in front of the traveling direction of the own vehicle; pedestrian information notifying existence of a pedestrian in front of the traveling direction of the own vehicle; stop line information notifying existence of a stop line in front of the traveling direction of the own vehicle, or the like. The driving support related information may include other useful information for driving support of the own vehicle. When the virtual image content 100 represents pedestrian information, a superimposed content is superimposed on the pedestrian existing on the road or in the intersection in front of the travelling direction of the own vehicle or superimposed a vicinity of the pedestrian. A non-superimposed content indicates a position of the pedestrian using an icon on a bird's eye view image showing the intersection or the road surface in front of the vehicle in the traveling direction.

The virtual image content 100 may further include information indicating an operation time of the vehicle, that is, content indicating operation time information and content indicating an operation area information. The operation area information indicates an area where the operation of the vehicle to be made. Hereinafter, the content indicating the operation time information is referred to as operation time content, and the content indicating the operation area information is referred to as operation area content. The operation time information may include accelerator on information indicating a time to operate the accelerator pedal on the forward road in the traveling direction of the vehicle, accelerator off information indicating a time to release the accelerator pedal, brake on information indicating a time to operate the brake pedal, brake off information indicating a time to release the brake pedal, or the like. The operation time information may further include other information indicating a time related to the operation of the vehicle. The operation area information may include an area for operating the accelerator pedal on the forward road in the traveling direction of the vehicle, that is, an accelerator on information represented by a traveling range. The operation area information may include an area for operating the brake pedal on the forward road in the traveling direction of the vehicle, that is, a brake on information represented by a travelling range. The operation area information may further include other information indicating a travelling area related to the operation of the vehicle. The operation time content and the operation area content may be displayed on the projection portion as superimposed content, or may be displayed on the projection portion as non-superimposed content.

The projection portion on which the HUD 230 projects the virtual image content 100 is not limited to the front windshield 10, and may be configured by a translucent combiner. The display device 23 may be configured by a combination meter, a center information display (CID), or the like.

The HCU 20 may be provided mainly by a microcomputer that includes a processor, a volatile memory, a non-volatile memory, an input output circuit, a bus connecting these components. The HCU 20 is connected to the HUD 230 and the in-vehicle LAN. The HCU 20 corresponds to an example of the vehicle display control device according to the present disclosure, and controls the display of HUD 230 by executing a control program stored in a storage medium such as a non-volatile memory. The control program includes a vehicle display control program according to the present disclosure. The HCU 20 performs a vehicle display control method according to the present disclosure by executing the control program. The memory is a non-transitory tangible storage medium for storing computer-readable programs and data. The non-transitory tangible storage medium may be provided by a semiconductor memory or a magnetic disk.

Figure 3:
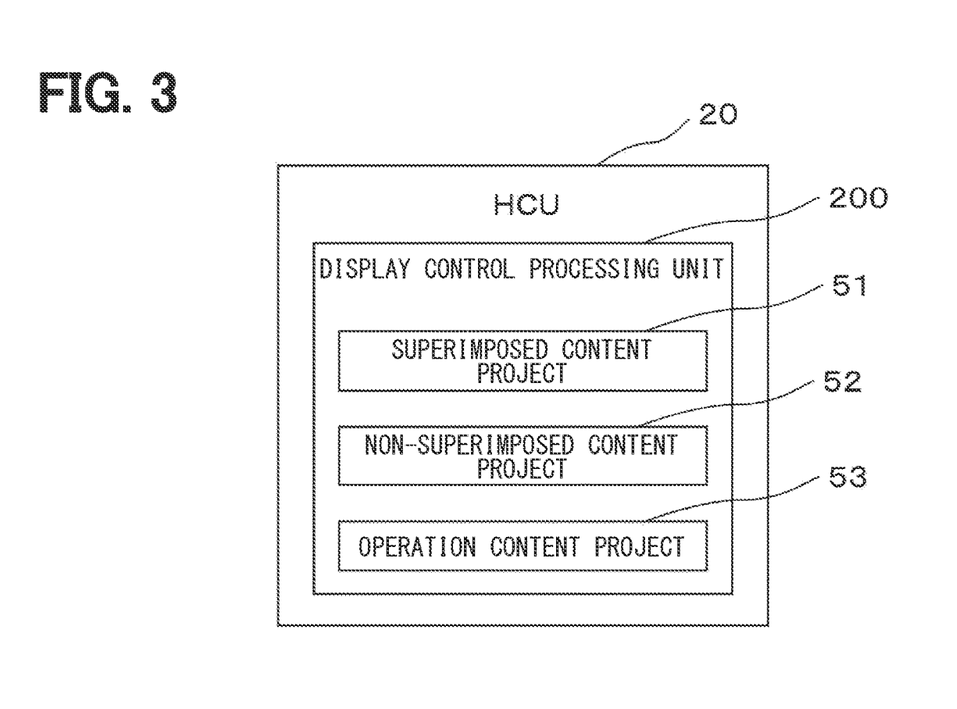
FIG. 3 is a diagram schematically showing a configuration example of a control system of a vehicle display control device according to the present disclosure.

The following will describe a configuration of the HCU 20 related to a display control of the HUD 230 in detail. As shown in FIG. 3, the HCU 20 functions as a display control processing unit 200 by executing the vehicle display control program in software manner. The HCU 20 may implement the display control processing unit 200 in hardware manner by logic circuits, or may implement the display control processing unit 200 in combination of software and hardware manner. The display control processing unit 200 includes a superposed content projection unit 51, a non-superimposed content projection unit 52, and an operation content projection unit 53.

The superimposed content projection unit 51 executes a superimposed content projection process. The superimposed content projection process is configured to project the superimposed content, which is an example of the virtual image content 100, in the projection area R of the front windshield 10 so as to be superimposed on the object included in the foreground of the own vehicle. The superimposed content is a virtual image content 100 that is projected so as to be positively superimposed on an object included in the foreground of the own vehicle. The non-superimposed content is a virtual image content 100 that is projected so as to be not positively superimposed on an object included in the foreground of the own vehicle. The superimposed content is different from the non-superimposed content which may be accidentally projected to be superimposed on an object included in the foreground of the own vehicle. The superimposed content may include a virtual image content 100 projected so that the virtual image content is along an object, such as the road included in the foreground of the own vehicle. The superimposed content may include a virtual image content 100 projected so that the virtual image content 100 extends in a depth direction of the front windshield 10 seen from the driver, that is, a forward extension direction of the travelling direction of the own vehicle. The superimposed content may include a virtual image content 100 projected so that a superimposed projection state of the virtual image content on an object included in the foreground of the own vehicle, such as a stop line actually existing in front of the traveling direction of the own vehicle is maintained regardless of a moving of the own vehicle. The superimposed content may include a virtual image content 100 projected so that a position relationship among the driver's viewpoint position, an actual front view of the own vehicle, and the projection position in the projection area R is maintained in a predetermined relationship.

The non-superimposed content projection unit 52 executes a non-superimposed content projection process. The non-superimposed content projection process is configured to project the non-superimposed content, which is an example of the virtual image content 100, in the projection area R of the front windshield 10 so as to be not superimposed on the object included in the foreground of the own vehicle. The non-superimposed content is a virtual image content 100 that is projected so as to be not positively superimposed on an object included in the foreground of the own vehicle. In some cases, the non-superimposed content may include a virtual image content 100 that is accidentally projected in superimposed manner on an object included in the foreground of the own vehicle.

The operation content projection unit 53 executes an operation content projection process. The operation content projection process is an example of a content display process, and is a process for projecting the operation content, for example, the operation time content or the operation area content described above in the projection area R of the front windshield 10. The operation content projection unit 53 may project the operation content as the superimposed content or as the non-superimposed content. The operation content projection unit 53 may project the operation content as the superimposed content by cooperating with the superimposed content projection unit 51. Alternatively, the operation content projection unit 53 may project the operation content as the superimposed content by itself. The operation content projection unit 53 may project the operation content as the non-superimposed content by cooperating with the non-superimposed content projection unit 52. Alternatively, the operation content projection unit 53 may project the operation content as the non-superimposed content by itself.

The following will describe a specific display of the virtual image content 100 by the HCU 20, particularly, specific display of the operation content by the HCU 20.

Figure 4:
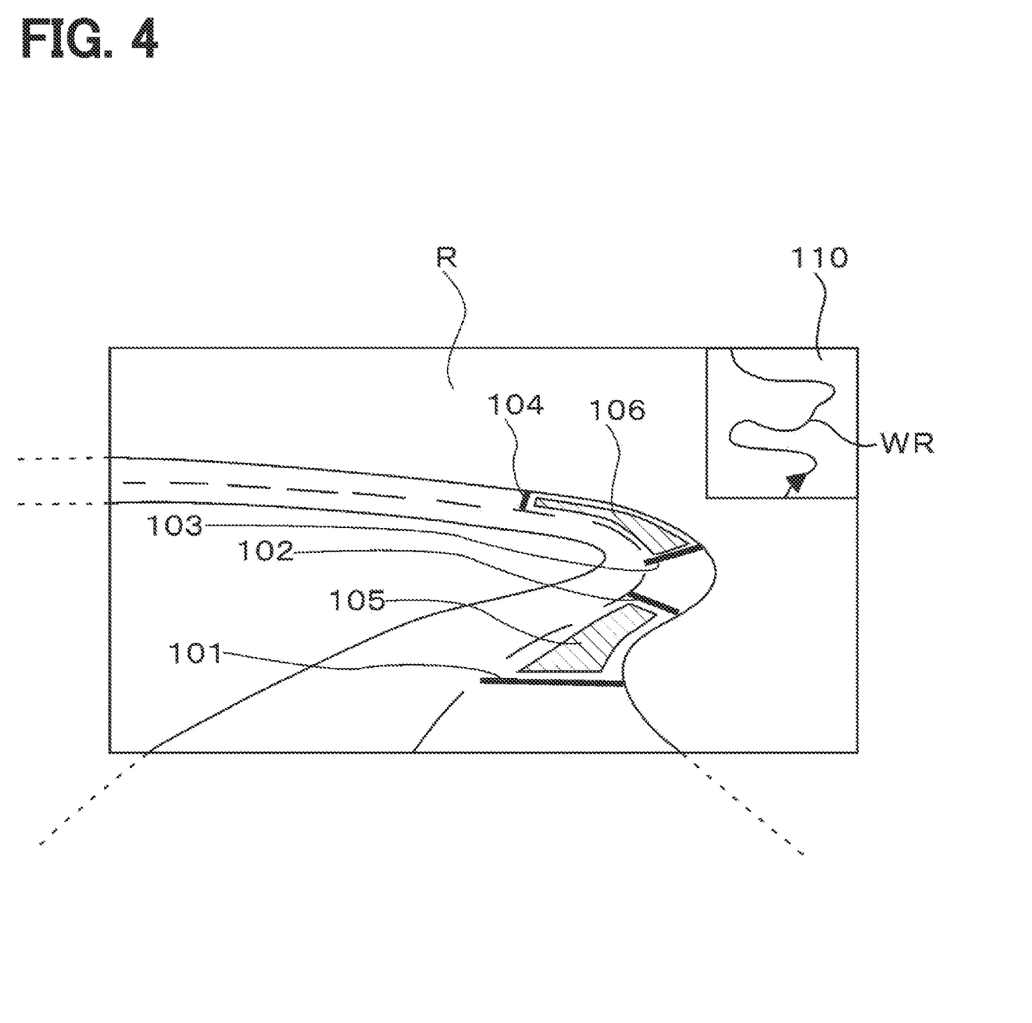
FIG. 4 is a diagram schematically showing a projection example of content according to a first embodiment of the present disclosure.

According to the display example shown in FIG. 4, the display control processing unit 200 of the HCU 20 displays the operation time contents 101, 102, 103, 104 in the projection area R of the front windshield 10. The operation time content 101 is an example of the operation content, and indicates accelerator on information. The operation time content 101 indicates an operation time, that is, depression time of the accelerator pedal on the road in front of the vehicle in the traveling direction. The operation time content 102 is an example of the operation content, and indicates accelerator off information. The operation time content 102 indicates an operation time, that is, release time of the accelerator pedal on the road in front of the vehicle in the traveling direction. The operation time content 103 is an example of the operation content, and indicates brake on information. The operation time content 103 indicates an operation time, that is, depression time of the brake pedal on the road in front of the vehicle in the traveling direction. The operation time content 104 is an example of the operation content, and indicates brake off information. The operation time content 104 indicates an operation time, that is, release time of the brake pedal on the road in front of the vehicle in the traveling direction.

The display control processing unit 200 displays multiple types of operation time contents 101, 102, 103, 104 as the superimposed contents. The display control processing unit 200 displays multiple types of operation time contents 101, 102, 103, 104 so as to be superimposed on the road that actually exists in front of the vehicle in the traveling direction. Therefore, the driver can visually recognize the time at which the accelerator pedal or the brake pedal should be depressed or released on the road actually existing in front of the vehicle in the traveling direction in an easy-to-understand manner.

The display control processing unit 200 displays multiple types of the operation time contents 101, 102, 103, 104 in the same shapes, specifically, as linear-shaped contents. Alternatively, the display control processing unit 200 may display multiple types of operation time contents 101, 102, 103, 104 in different shapes from one another.

The display control processing unit 200 may display multiple types of operation time contents 101, 102, 103, 104 in different colors from one another. Specifically, the display control processing unit 200 may display the operation time content 101 indicating the accelerator on information in blue, the operation time content 102 indicating the accelerator off information in yellow, the operation time content 103 indicating the brake on information in red, and the operation time content 104 indicating the brake off information in purple. The colors of the multiple types of the operation time contents 101, 102, 103, 104 may be appropriately changed and set. The display control processing unit 200 may display the multiple types of operation time contents 101, 102, 103, 104 in the same color. The display control processing unit 200 may appropriately change a display mode, for example, a size, a thickness, a color, a color intensity of the multiple types of operation time contents 101, 102, 103, 104 to be different from one another. Alternatively, the display mode of the multiple types of operation time contents may be the same. The display control processing unit 200 may display the operation time contents 101, 102, 103, 104 in glittered manner, light-on manner, or blinking manner.

The display control processing unit 200 may display the operation area contents 105 and 106 in the projection area R of the front windshield 10. The operation area content 105 is an example of the operation content, and indicates accelerator on information. The operation area content 105 indicates an operation area of the accelerator pedal, that is, a travelling range within which the accelerator pedal is to be depressed on the road in front of the vehicle in the traveling direction. The operation area content 105 is superimposed and displayed on the area between the operation time content 101 and the operation time content 102 on the road existing in front of the vehicle in the traveling direction. The operation area content 106 is an example of the operation content, and indicates brake on information. The operation area content 105 indicates an operation area of the brake pedal, that is, a travelling range within which the brake pedal is to be depressed on the road in front of the vehicle in the traveling direction. The operation area content 106 is superimposed and displayed on the area between the operation time content 103 and the operation time content 104 on the road existing in front of the vehicle in the traveling direction.

The display control processing unit 200 displays multiple types of operation area contents 105, 106 as the superimposed contents. The display control processing unit 200 displays multiple types of operation area contents 105, 106 so as to be superimposed on the road that actually exists in front of the vehicle in the traveling direction. Therefore, the driver can visually recognize the area in which the accelerator pedal or the brake pedal should be depressed on the road actually existing in front of the vehicle in the traveling direction in an easy-to-understand manner.

The display control processing unit 200 displays multiple types of the operation area contents 105, 106 in the same shapes, specifically, as band-shaped contents. Alternatively, the display control processing unit 200 may display multiple types of operation area contents 105, 106 in different shapes from one another.

The display control processing unit 200 may display multiple types of operation area contents 105, 106 in different colors from one another. The display control processing unit 200 may display the operation area content 105 indicating the accelerator on information in blue, and display the operation area content 106 indicating the brake on information in red. The colors of the multiple types of the operation area contents 105, 106 may be appropriately changed and set. The display control processing unit 200 may display the multiple types of operation area contents 105, 106 in the same color. The display control processing unit 200 may appropriately change a display mode, for example, a size, a thickness, a color, a color intensity of the multiple types of operation area contents 105, 106 to be different from one another. Alternatively, the display mode of the multiple types of operation area contents may be the same. The display control processing unit 200 may display the operation area contents 105, 106 in glittered manner, light-on manner, or blinking manner.

The display control processing unit 200 may display a denotation content 110 in the projection area R of the front windshield 10. The denotation content 110 indicates denotation information. The denotation information indicates meaning of the operation content displayed in the projection area R of the front windshield 10, that is, the meaning of the operation time indicated by the operation time content and the meaning of the operation area indicated by the operation area content. The denotation content 110 indicates information related to a mountain road WR including multiple curves existing in front of the vehicle in the traveling direction. For example, the denotation content 110 may indirectly indicate that the operation times and the operation areas are set with consideration of the travelling of the mountain road WR by the own vehicle. Herein, the operation times are indicated by the multiple types of operation time contents 101, 102, 103, 104 displayed as described above, and the operation areas are indicated by the multiple types of operation area contents 105, 106 displayed as described above. The denotation content 110 may directly indicate that the operation contents, such as the operation times and the operation areas are set with consideration of the travelling of the mountain road WR by the own vehicle. For example, the denotation content may be provided by character message information or audio message information of "Operation times and operation areas optimized for mountain road are displayed". The character message information may be displayed in the projection area R, and the audio message information may be output as an audio signal.

The display control processing unit 200 may display the denotation content 110 as a non-superimposed content. The display control processing unit 200 may display the denotation content 110 in a corner portion of the projection area R of the front windshield 10 in a non-superimposed manner on the road actually existing in front of the vehicle in the traveling direction. The denotation content 110 displayed in this manner provides, to the driver, complementary information for complementing or reinforcing the operation time content indicating operation time of the vehicle or the operation area content indicating operation area where the operation of the vehicle to be made. That is, the denotation content is different from the operation time content or the operation area content.

The denotation content 110 is not limited to information indicating that the mountain road WR exists in front of the vehicle in the traveling direction. For example, various kinds of information, such as information indicating existence of slope in front of the vehicle in the traveling direction, occurrence of traffic congestion in front of the vehicle in the traveling direction, weather information in near future may be displayed as the denotation content. The denotation content 110 may indirectly indicate various types of information using icons or the like, or may directly indicate various types of visual information using character or message information. The denotation content 110 may be visual information displayed to the driver, or may be audio information output as an audio signal to the driver. The display position of the denotation content 110 in the projection area R may be appropriately changed and set. For example, the denotation content 110 may be displayed at a position which is not overlapped with the road existing in front of the vehicle in the traveling direction.

Figure 5:
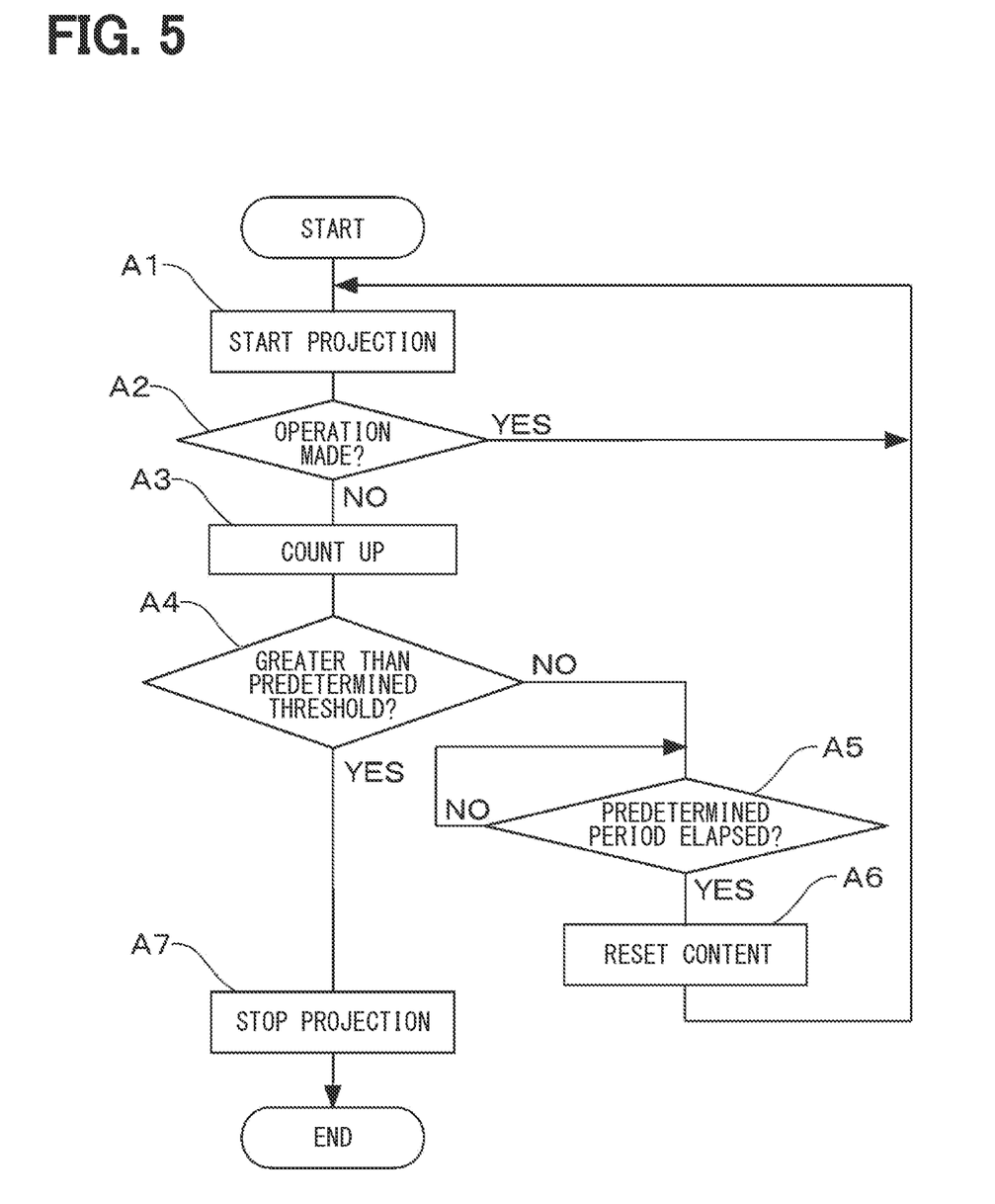
FIG. 5 is a flowchart schematically showing an operation example of the vehicle display control device according to the first embodiment.

The following will describe an operation of the HCU 20 according to the present disclosure. In the present disclosure, the display control processing unit 200 of the HCU 20 corresponds to a display controller. As shown in FIG. 5, the display control processing unit 200 of the HCU 20 starts, in A1, an operation content projection process in response to the travelling of vehicle being started. In A1, various types of operation contents are displayed in the projection area R of the front windshield 10. The start condition of the operation content projection process is not limited to the start of the vehicle travelling. For example, the operation content projection process may be started in response to activation of the display device 23 or start of the operation content projection process being activated by the driver's operation. Alternatively, other start conditions may be set.

After the display control processing unit 200 starts the operation content projection process, the process monitors, in A2, whether actual operation is made by the driver according to the displayed operation content when the vehicle reaches the operation time or the operation area indicated by the displayed operation content.

When the driver actually operates the operation content indicated by the operation content at a time the vehicle reaches the operation time or the operation area indicated by the displayed operation content, the display control processing unit 200 determines YES in A2, and returns to A1 and continues projection of operation contents. The display control processing unit 200 continues the projection of operation contents by resetting the operation contents corresponding to the travelling of the vehicle. As a result, the operation content according to the traveling condition of the vehicle can be appropriately displayed in the projection area R of the front windshield 10.

When the driver actually does not operate the operation content indicated by the operation content at a time the vehicle reaches the operation time or the operation area indicated by the displayed operation content, the display control processing unit 200 determines NO in A2, and proceeds to A3. In A3, a non-operation counter is incremented by one. The display control processing unit 200 confirms whether the value of the non-operation counter exceeds a predetermined threshold in A4. The predetermined threshold may be changed and set as appropriate. In one example, the predetermined threshold may be set to 3.

When the value of the non-operation counter does not exceed the predetermined threshold (A4: NO), the display control processing unit 200 monitors, in A5, whether a predetermined period has elapsed from the negative determination is made in A2. The predetermined period can be appropriately changed and set. When the predetermined period has elapsed (A5: YES), the display control processing unit 200 executes a reset process in A6. In the reset process, the display control processing unit 200 determines the current traveling condition of the vehicle. The travelling condition may include the vehicle position, the traveling speed, the shape, the slope, the type of the road existing in front of the traveling direction of the vehicle, and weather condition around the vehicle. The operation content to be displayed is set again according to the various information described above. Then, the display control processing unit 200 returns to A1, and displays the operation content obtained by the reset process in the projection area R of the front windshield 10.

When the value of the non-operation counter exceeds the predetermined threshold (A4: YES), the display control processing unit 200 stops execution of the operation content projection process in A7. Then, the display control processing unit 200 ends the process shown in FIG. 5. The display control processing unit 200 may notify, for example, by display or audio to the driver that the execution of the operation content projection is stopped. The display control processing unit 200 may end the process shown in FIG. 5 when a predetermined end condition is satisfied. The predetermined end condition is satisfied, for example, when the ignition switch of the vehicle is turned off, when the route guidance of the vehicle is finished, when the display device 23 is turned off, or when the driver inputs an operation to end the operation content projection process.

In the present disclosure, the vehicle is operated by the driver based on the operation time indicated by the operation content displayed in the projection area R of the front windshield 10. Thus, the operation of the vehicle can be made at an optimum time. As a result, it is possible to further optimize the operation of the vehicle by the driver, thereby improving an optimized travelling of the vehicle.

When the vehicle is not operated at the operation time or in the operation area indicated by the operation content displayed in the projection area R of the front windshield 10, the display control processing unit 200 executes the reset process to set the subsequent operation time or the operation area. Then, the operation contents indicating the operation time and operation area set by the reset process are displayed. In a case where one of the operations indicated by the operation contents displayed in the projection area R of the front windshield 10 is not executed, the contents of the optimum operation contents to be displayed successively may be changed. Therefore, when the operation indicated by the operation content is not executed, the operation content to be displayed successively is set again. With this configuration, most optimum operation content can be displayed in successive manner according to the actual situation of the vehicle, that is, the situation where the operation indicated by the operation content is not executed by driver.

When the vehicle is not operated at the operation time or in the operation area indicated by the operation contents displayed in the projection area R of the front windshield 10, the display control processing unit 200 resets the operation content after the predetermined period has elapsed. When the operation indicated by the operation content is not executed, the reset process is not performed immediately. Instead, the reset process is performed after a certain period of time has elapsed. After elapse of the certain time period, the travelling condition of the vehicle may change. Thus, the operation content can be reset in a stable state, and the more optimal operation content can be set and displayed to the driver with consideration of the change of travelling condition.

The display control processing unit 200 stops the operation content projection when the vehicle is not operated at the operation time or in the operation area indicated by the operation content displayed in the projection area R of the front windshield 10. When the operation time or the operation area indicated by the displayed operation content does not match the driving style of the driver, there is a high possibility that the vehicle will not be operated according to the operation time or the operation area indicated by the operation content. Therefore, by stopping the execution of the operation content projection in response to the vehicle being not operated at the operation time or in the operation area indicated by the displayed operation content, continued display of the operation content that is not suitable for the driving style of the driver can be avoided.

The display control processing unit 200 stops the operation content projection in response to the number of times the vehicle has not been operated at the operation time or in the operation area indicated by the displayed operation content exceeding the predetermined threshold. Therefore, it is possible to prevent the execution of the operation content projection from being stopped when the driver accidentally misses the operation corresponding to the operation content, such as the operation time or the operation area indicated by the displayed operation content. The display control processing unit 200 stops the operation content projection in response to the number of times the vehicle has not been operated at the operation time or in the operation area indicated by the displayed operation content exceeding two or more. Thus, the operation content projection can be stopped only in a case where the driver intentionally does not make the operation. The execution of the operation content projection may be stopped based on a sum of the number of times by which the operation corresponding to the operation time indicated by the displayed operation content is not made and the number of times by which the operation corresponding to the operation area indicated by the displayed operation content is not made. Alternatively, the execution of the operation content projection may be stopped in response to the successive number of times by which the operation corresponding to the operation time indicated by the displayed operation content is not made. Alternatively, the execution of the operation content projection may be stopped in response to the successive number of times by which the operation corresponding to the operation area indicated by the displayed operation content is not made.

The display control processing unit 200 displays, in the projection area R of the front windshield 10, the denotation content 110 indicating the meaning of the operation time and the operation area indicated by the operation content displayed Therefore, based on the denotation content 110, the meaning of the information indicated by the operation content can be easily transmitted to the driver, and more detailed information can be provided to the driver. The display control processing unit 200 may switch a display mode between a first mode in which display of the denotation content 110 is activated and a second mode in which display of the denotation content 110 is deactivated.

Second Embodiment

The following will describe a second embodiment of the present disclosure. In a display mode example illustrated in FIG. 6, the display control processing unit 200 of the HCU 20 displays, as the superimposed contents, partial operation time contents 101, 102, 103 among the whole operation time contents 101, 102, 103, 104 that can be displayed in the projection area R of the front windshield 10. In this case, the partial operation time contents 101, 102, 103 that are close to the own vehicle are selected to be displayed as the superimposed contents. Then, the display control processing unit 200 displays, as the non-superimposed content, the operation time content 104 farthest from the own vehicle among the multiple operation time contents 101, 102, 103, 104 in the projection area R of the front windshield 10.

Figure 6:
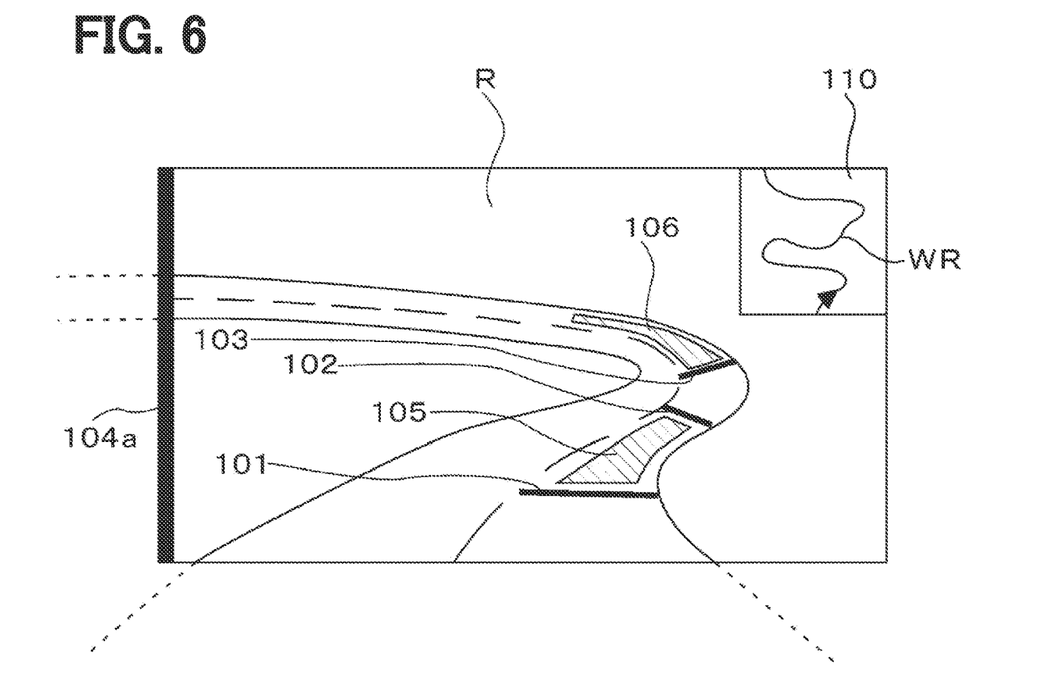
FIG. 6 is a diagram schematically showing a projection example of content according to a second embodiment of the present disclosure.

The display control processing unit 200 displays the operation time content 104 displayed as the non-superimposed content in a different manner from the remaining operation time contents 101, 102, 103 displayed as the superimposed contents. Specifically, the display control processing unit 200 displays, as a simple content 104a, a bar-shaped element corresponding to the operation time content 104 on one side of the projection area R of the front windshield 10, that is, on one side of the road in front of the vehicle in the traveling direction. The display control processing unit 200 may display the simple content 104a in glittered manner, light-on manner, or blinking manner.

According to this embodiment, among the multiple operation time contents 101, 102, 103, 104 that can be displayed in the projection area R of the front windshield 10, the operation time content 104 farthest from the vehicle in front of the vehicle in the traveling direction is not displayed in superimposed manner on the road. Instead, the operation time content 104 farthest from the vehicle is displayed as the non-superimposed content, and the display manner is set to be different from the remaining operation time contents. Since the traveling environment changes over time, when the vehicle reaches the point corresponding to the farthest operation content, content of the information, for example, display position to be notified to the driver may be changed. In the configuration where the operation contents close to the vehicle are displayed as the superimposed contents and the operation contents far from the vehicle are displayed as the non-superimposed contents, it is possible to avoid giving unnecessary information to the driver.

Further, the operation content that is not superimposed on the road is displayed as a bar shaped simple content 104a. Therefore, it is possible to inform the driver, in advance, that there is a possibility that some operation time or operation area exists on the road ahead of the operation time contents 101, 102, 103, thereby informing the driver an existence of travelling information in advance.

Figure 7:
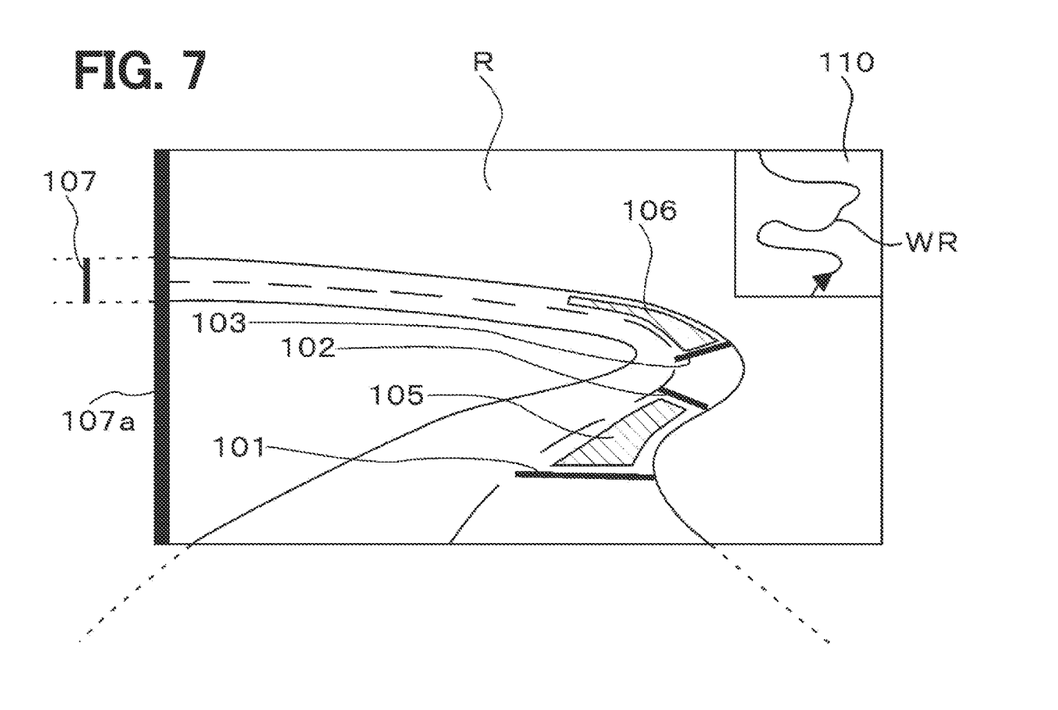
FIG. 7 is a diagram schematically showing another projection example of content according to the second embodiment.

In another example as illustrated in FIG. 7, instead of displaying, using the simple content 104a, the operation time content 104 that can be displayed in the projection area R of the front windshield 10, the display control processing unit 200 may display, using a simple content 107a, an operation content 107 to be displayed on the road but existing out of the projection area R of the front windshield 10. In this configuration, the operation content 107, which exists out of the projection area R of the front windshield, can be displayed in a simplified manner, that is, in the non-superimposed manner.

Third Embodiment

The following will describe a third embodiment of the present disclosure. In a display mode example illustrated in FIG. 8, the display control processing unit 200 of the HCU 20 displays recommended travel lane information 101r, 102r, 103r, 104r corresponding to each of the operation time contents 101, 102, 103, 104 displayed in the projection area R of the front windshield 10. The recommended travel lane information 101r, 102r, 103r, 104r indicates the travel lane recommended for the driver to travel. In this example, the content indicates the recommended travel lane is provided by a triangle icon.

Figure 8:
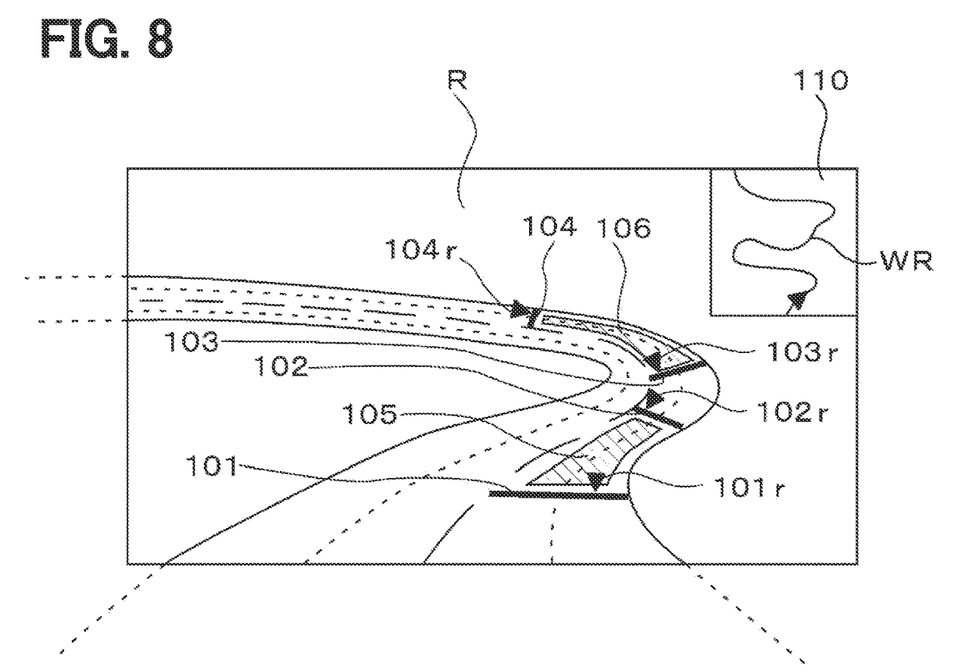
FIG. 8 is a diagram schematically showing a projection example of content according to a third embodiment of the present disclosure.

The display control processing unit 200 may display multiple recommended travel lane information 101r, 102r, 103r, 104r as the superimposed contents. The display control processing unit 200 displays the recommended travel lane information 101r, 102r, 103r, 104r by superimposing them on the corresponding traveling lanes included in the road actually existing in front of the vehicle in the traveling direction. Therefore, the driver can visually recognize which travel lane should be taken on the road that actually exists in front of the vehicle in the traveling direction in an easy manner.

The display control processing unit 200 may be configured to display the closet one or the closet several recommended travel lane information in the traveling direction of the vehicle instead of displaying entire recommended travel lane information 101r, 102r, 103r, 104r that can be displayed in the projection area R of the front windshield 10. The number of closet several recommended travel lane information may be appropriately set, for example, by the user or in default manner. The optimum travel lane determined with consideration of a shape, a curvature, a slope, type of the road existing in front of the vehicle in the traveling direction may be set as the recommended travel lane.

According to the present embodiment, the recommended travel lane information is included in the operation content displayed in the projection area R of the front windshield 10. Therefore, the driver can easily recognize the recommended travel lane in front of the vehicle in the traveling direction, and can provide the driver with more detailed driving support information.

Fourth Embodiment

The following will describe a fourth embodiment of the present disclosure. In a display mode example illustrated in FIG. 9, the display control processing unit 200 of the HCU 20 displays an operation area content 108 in the projection area R of the front windshield 10. The operation area content 108 indicates accelerator-on information, and a width of the content in road width direction differs in the longitudinal direction of the road. The width of the operation area content 108 indicates a recommended operation amount of the accelerator pedal, that is, the amount of depression. Specifically, the wider part indicates a greater depression amount of the accelerator pedal, and the narrower part indicates a smaller depression amount of the accelerator pedal.

Figure 9:
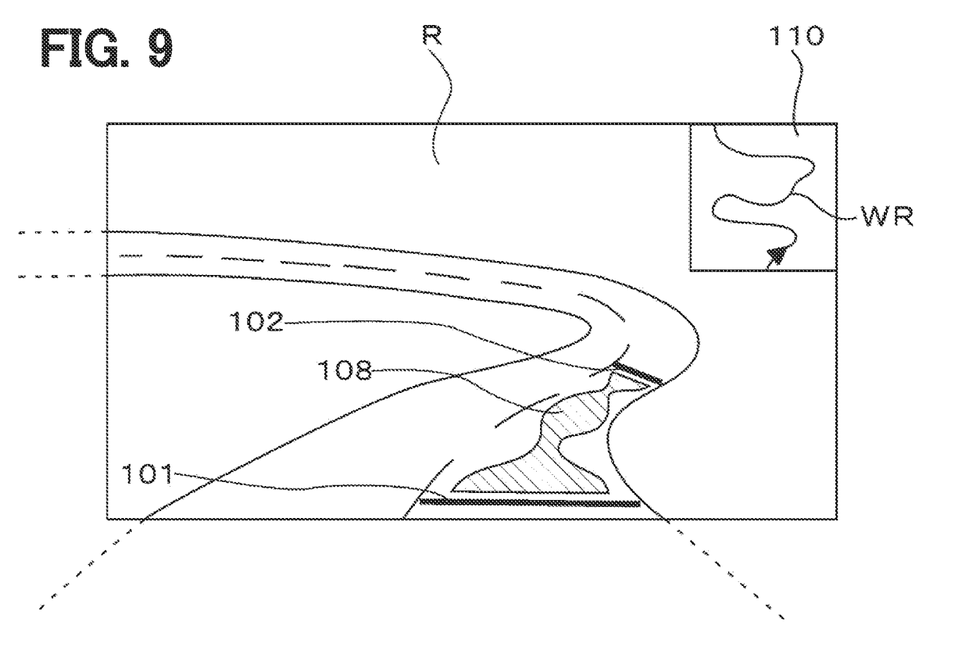
FIG. 9 is a diagram schematically showing a projection example of content according to a fourth embodiment of the present disclosure.

According to this embodiment, the driver can visually recognize the operation amount of accelerator pedal based on the width of operation are content 108 in road width direction in an easy manner. Therefore, more detailed driving support information can be provided to the driver. The display control processing unit 200 may display the operation contents indicating brake off information with different widths according to the recommended operation amounts of the brake pedal. The display control processing unit 200 may display a size, a color, a color intensity of the operation content in different manners according to the recommended operation amount.

Fifth Embodiment

Figure 10:
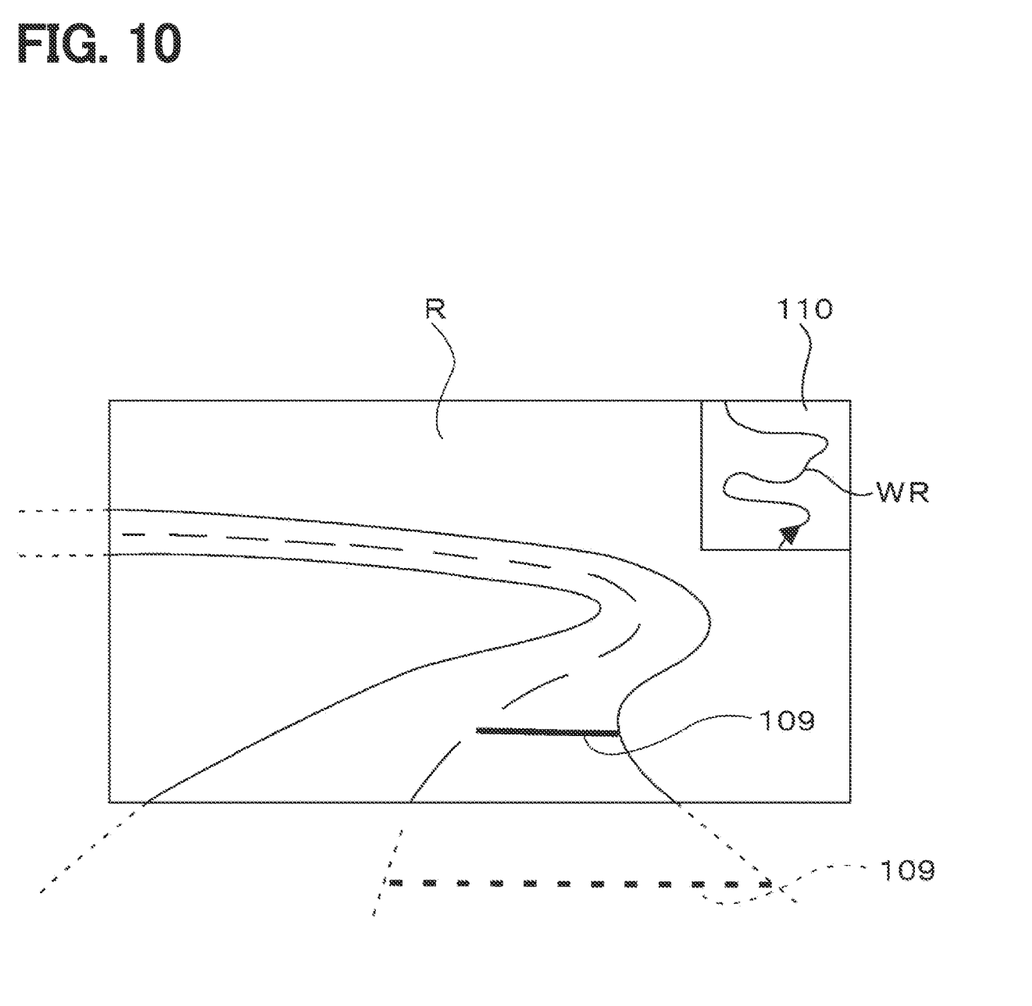
FIG. 10 is a diagram schematically showing a projection example of content according to a fifth embodiment.

The following will describe a fifth embodiment of the present disclosure. As illustrated in FIG. 10, an operation content 109 is displayed in the projection area R of the front windshield 10 at a position where the vehicle has not yet reached. Therefore, when the vehicle actually reaches the operation time or the operation area indicated by the displayed operation content 109, that is at the time the vehicle actually reaches the operation content 109 shown by broken line, the display control processing unit 200 of the HCU 20 executes a predetermined notification process to notify the driver that the vehicle has actually reached the position of the operation content 109. The predetermined notification process may be executed to notify, in audio manner, that the vehicle has actually reached the operation time or the operation area indicated by the displayed operation content 109. The predetermined notification process may be executed to notify, in audio manner and in advance, an estimated time when the vehicle actually reaches the operation time or the operation area indicated by the displayed operation content 109. The predetermined notification process may be executed, in tactile manner, by vibrating the steering wheel or the seat of occupant. The predetermined notification process may be executed, in visual manner, by displaying information using message or characters in the projection area R of the front windshield 10. The predetermined notification process may be executed, in visual manner, by displaying the whole or partial portion, for example, periphery portion of the projection area R of the front windshield 10 in light-on manner, blinking manner, or glittered manner. Under a condition that the predetermined notification process can notify that the vehicle actually reaches the operation time or the operation area indicated by the displayed operation content 109 and does not hinder the safe driving of the vehicle, various other processes can be executed as the predetermined notification process.

According to the present embodiment, the driver can operate the vehicle at a more accurate time by being notified that the vehicle has actually reached the operation time or the operation area indicated by the displayed operation content 109. Therefore, the operation of the vehicle by the driver can be further optimized.

Sixth Embodiment

The following will describe a sixth embodiment of the present disclosure. In a display mode example illustrated in FIG. 11, the display control processing unit 200 of the HCU 20 displays fuel consumption information content 120 in the projection area R of the front windshield 10. The fuel consumption information content 120 indicates information on the fuel consumption of the vehicle. In the present embodiment, the fuel consumption information content 120 is displayed at an end portion of the projection area R in non-superimposed manner.

Figure 11:
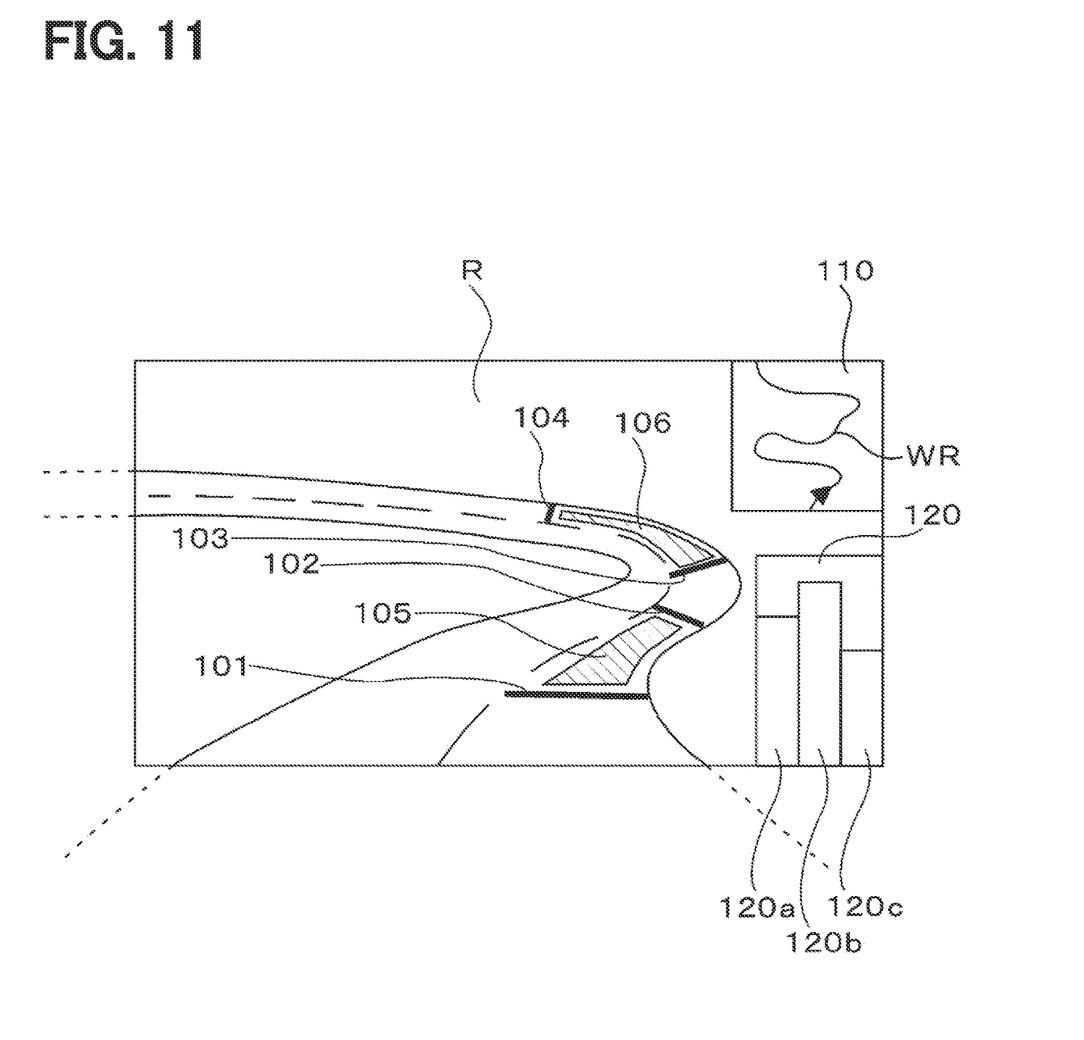
FIG. 11 is a diagram schematically showing a projection example of content according to a six embodiment of the present disclosure.

The fuel consumption information content 120 is displayed, as a specific example, by comparing three parameters. The three parameters include current fuel consumption information 120a indicating the fuel consumption calculated based on the current travelling condition of the vehicle, past fuel consumption information 120b indicating the fuel consumption calculated based on past travelling condition of the vehicle, and specification fuel consumption information 120c indicating the fuel consumption calculated based on the performance of vehicle defined in the specification. The past fuel consumption information 120b may indicate the fuel consumption calculated based on the immediately previous travelling condition of the vehicle. Alternatively, the past fuel consumption information 120b may indicate the best fuel consumption or the worst fuel consumption among the fuel consumptions calculated based on the past travelling conditions of the vehicle. The past fuel consumption information 120b may indicate an average value or a median value of fuel consumption calculated based on the past travelling conditions of the vehicle. The specification fuel consumption information 120c may be defined in advance by, for example, a vehicle manufacturer, a dealer, or the like. Alternatively, the specification fuel consumption information 120c may be calculated by the display control processing unit 200 based on various performance information of the vehicle.

According to the present embodiment, information on the fuel efficiency of the vehicle can also be provided to the driver, and the driver can be encouraged to operate the vehicle with good fuel efficiency.

Other Embodiments

The present disclosure is not limited to the above-described embodiments, and various modifications and extensions can be made without departing from the spirit of the present disclosure. For example, the above-described embodiments may be combined as appropriate. Further, a shape, a size, a thickness and the like of the virtual image content 100 projected on the front windshield 10 can be appropriately changed.

The display is not limited to the HUD 230. For example, a display panel of the navigation device mounted on the vehicle, a meter system display that displays the meter information such as the traveling speed of the vehicle and the rotation speed of the engine may be used as the display instead of the HUD 230.

Although the present disclosure has been described in accordance with the above embodiments, it is understood that the present disclosure is not limited to the above embodiments and configurations. The present disclosure incorporates various modifications and variations within a scope of equivalents. In addition, various combinations and configurations, as well as other combinations and configurations that include only one element, more, or less, are within the scope and spirit of the present disclosure.

The controller and the method thereof described in the present disclosure may be implemented by a special purpose computer including a processor programmed to execute one or more functions by executing a computer program and a memory. Alternatively, the controller and the method described in the present disclosure may be implemented by a special purpose computer including a processor with one or more dedicated hardware logic circuits. Alternatively, the controller and the method thereof described in the present disclosure may be implemented by a combination of (i) a special purpose computer including a processor programmed to execute one or more functions by executing a computer program and a memory and (ii) a special purpose computer including a processor with one or more dedicated hardware logic circuits. The computer program may be stored in a computer-readable non-transitory tangible storage medium as instructions to be executed by a computer.

What is claimed is:

1. A vehicle display control device comprising:
a display; and
a display controller executing a content display process to display, on the display, a content indicating an operation time of a vehicle, the operation time of the vehicle including at least one of accelerator on information, accelerator off information, brake on information and brake off information, wherein the display controller stops executing the content display process in response to the vehicle being not operated at the operation time indicated by the displayed content, the operation time of the vehicle indicates a start time of an operation to be made by a driver of the vehicle, the operation to be made by the driver of the vehicle includes at least one of accelerator on, accelerator off, brake on and brake off, and the content indicating the operation time of the vehicle is displayed on the display before the driver actually performs the operation of the vehicle and visually guides, in advance, the driver about the operation time at which the operation of the vehicle should be made.

2. The vehicle display control device according to claim 1, wherein the display controller executes a reset process in response to the vehicle being not operated at the operation time indicated by the displayed content, and in the reset process, the display controller resets a subsequent operation time and displays a content indicating the reset subsequent operation time on the display.

3. The vehicle display control device according to claim 2, wherein, when the vehicle is not operated at the operation time indicated by the displayed content, the display controller executes the reset process after an elapse of a predetermined time period from the operation time indicated by the displayed content.

4. The vehicle display control device according to claim 1, wherein the display controller displays, on the display, denotation information indicating a denotation of the operation time indicated by the displayed content.

5. The vehicle display control device according to claim 1, wherein the display controller executes a predetermined notification process in response to an arrival of the operation time indicated by the displayed content.

6. The vehicle display control device according to claim 1, wherein the display includes a display area which enables a display of a plurality of the contents, and the display controller displays a part of the plurality of the contents in the display area of the display.

7. The vehicle display control device according to claim 1, wherein the display includes a display area which enables a display of a plurality of the contents, and the display controller displays, in the display area, a part of the plurality of the contents in a different display mode from a display mode of a remaining part of the plurality of the contents.

8. The vehicle display control device according to claim 1, wherein the content includes recommended travel lane information indicating a recommended travel lane of the vehicle.

9. The vehicle display control device according to claim 1, further comprising:

an operation input unit operated by a driver of the vehicle and inputting an operation to the vehicle, wherein the content includes operation amount information indicating an operation amount of the operation input unit.

10. A vehicle display control device comprising:

a display; and a display controller executing a content display process to display, on the display, a content indicating an operation time of a vehicle, the operation time of the vehicle including at least one of accelerator on information, accelerator off information, brake on information and brake off information, wherein the display controller enables a display of the content in a superimposed manner in which the content is superimposed on an object included in a foreground of the vehicle or in a non-superimposed manner in which the content is not superimposed on the object included in the foreground of the vehicle, the operation time of the vehicle indicates a start time of an operation to be made by a driver of the vehicle, the operation to be made by the driver of the vehicle includes at least one of accelerator on, accelerator off, brake on and brake off, and the content indicating the operation time of the vehicle is displayed on the display before the driver actually performs the operation of the vehicle and visually guides, in advance, the driver about the operation time at which the operation of the vehicle should be made.

11. A vehicle display control method comprising:

executing, by a microcomputer, a content display process that displays, on a display, a content indicating an operation time of a vehicle, the operation time of the vehicle including at least one of accelerator on information, accelerator off information, brake on information and brake off information; and stopping execution of the content display process in response to the vehicle being not operated at the operation time indicated by the displayed content, wherein the operation time of the vehicle indicates a start time of an operation to be made by a driver of the vehicle, the operation to be made by the driver of the vehicle includes at least one of accelerator on, accelerator off, brake on and brake off, and the content indicating the operation time of the vehicle is displayed on the display before the driver actually performs the operation of the vehicle and visually guides, in advance, the driver about the operation time at which the operation of the vehicle should be made.

12. A vehicle display control method comprising:

executing, by a microcomputer, a content display process that displays, on a display, a content indicating an operation time of a vehicle, the operation time of the vehicle including at least one of accelerator on information, accelerator off information, brake on information and brake off information, wherein the content display process enables a display of the content in a superimposed manner in which the content is superimposed on an object included in a foreground of the vehicle or in a non-superimposed manner in which the content is not superimposed on the object included in the foreground of the vehicle, the operation time of the vehicle indicates a start time of an operation to be made by a driver of the vehicle, the operation to be made by the driver of the vehicle includes at least one of accelerator on, accelerator off, brake on and brake off, and the content indicating the operation time of the vehicle is displayed on the display before the driver actually performs the operation of the vehicle and visually guides, in advance, the driver about the operation time at which the operation of the vehicle should be made.

13. A vehicle display control program product stored in a computer readable non-transitory storage medium, the vehicle display control program product comprising instructions for:

executing, by a microcomputer, a content display process that displays, on a display, a content indicating an operation time of a vehicle, the operation time of the vehicle including at least one of accelerator on information, accelerator off information, brake on information and brake off information; and stopping execution of the content display process in response to the vehicle being not operated at the operation time indicated by the displayed content, wherein the operation time of the vehicle indicates a start time of an operation to be made by a driver of the vehicle, the operation to be made by the driver of the vehicle includes at least one of accelerator on, accelerator off, brake on and brake off, and the content indicating the operation time of the vehicle is displayed on the display before the driver actually performs the operation of the vehicle and visually guides, in advance, the driver about the operation time at which the operation of the vehicle should be made.

14. A vehicle display control program product stored in a computer readable non-transitory storage medium, the vehicle display control program product comprising instructions for:

executing, by a microcomputer, a content display process that displays, on a display, a content indicating an operation time of a vehicle, the operation time of the vehicle including at least one of accelerator on information, accelerator off information, brake on information and brake off information, wherein the content display process enables a display of the content in a superimposed manner in which the content is superimposed on an object included in a foreground of the vehicle or in a non-superimposed manner in which the content is not superimposed on the object included in the foreground of the vehicle, the operation time of the vehicle indicates a start time of an operation to be made by a driver of the vehicle, the operation to be made by the driver of the vehicle includes at least one of accelerator on, accelerator off, brake on and brake off, and the content indicating the operation time of the vehicle is displayed on the display before the driver actually performs the operation of the vehicle and visually guides, in advance, the driver about the operation time at which the operation of the vehicle should be made.

* * * * *